(12) United States Patent  
Ueno et al.

(10) Patent No.: US 9,231,413 B2  
(45) Date of Patent: Jan. 5, 2016

(54) WIRELESS POWER TRANSMISSION DEVICE

(75) Inventors: Takeshi Ueno, Kawasaki (JP); Kohei Onizuka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 833 days.

(21) Appl. No.: 13/461,097

(22) Filed: May 1, 2012

(65) Prior Publication Data

US 2012/0235509 A1  Sep. 20, 2012

Related U.S. Application Data

(63) Continuation of application No. PCT/JP2009/069550, filed on Nov. 18, 2009.

(51) Int. Cl.
| | | |
|---|---|---|
| H02J 17/00 | (2006.01) | |
| H02J 5/00 | (2006.01) | |
| H02J 7/02 | (2006.01) | |
| H02J 7/00 | (2006.01) | |

(52) U.S. Cl.
CPC ............. H02J 5/005 (2013.01); H02J 7/025 (2013.01); *H02J 7/0004* (2013.01)

(58) Field of Classification Search
None
See application file for complete search history.

(56) References Cited

U.S. PATENT DOCUMENTS

| | | | |
|---|---|---|---|
| 7,522,878 B2 | 4/2009 | Baarman | |
| 2004/0095291 A1 | 5/2004 | Shigemasa et al. | |
| 2004/0130915 A1 | 7/2004 | Baarman | |
| 2010/0213770 A1 | 8/2010 | Kikuchi | |
| 2011/0025132 A1 | 2/2011 | Sato | |
| 2011/0298294 A1* | 12/2011 | Takada et al. | 307/104 |
| 2012/0001485 A1* | 1/2012 | Uchida | 307/11 |

FOREIGN PATENT DOCUMENTS

| | | |
|---|---|---|
| JP | 11-188113 | 7/1999 |
| JP | H11-188113 | 7/1999 |
| JP | 2001-238372 | 8/2001 |
| JP | 2004-166384 | 6/2004 |
| JP | 2006-517778 | 7/2006 |

(Continued)

OTHER PUBLICATIONS

English-language translation of International Preliminary Report on Patentability for PCT/JP2009/069550.
Office Action issued Nov. 5, 2013 in counterpart Japanese Patent Application No. 2011-541755 and English-language translation thereof.
International Search Report for PCT/JP2009/069550 mailed Feb. 16, 2010.

(Continued)

*Primary Examiner* — Rexford Barnie
*Assistant Examiner* — Aqeel Bukhari
(74) *Attorney, Agent, or Firm* — Nixon & Vanderhye, P.C.

(57) ABSTRACT

In one embodiment, a power reception device includes a load circuit, to which a first signal having a first power value is supplied from a first resonance circuit connected to a power reception coil, and a first transceiver which transmits the first power value to a power transmission device. The power transmission device includes a second resonance circuit including a plurality of inductors and capacitors to which a second signal having a second power value is input, a power transmission coil connected to the second resonance circuit, a second transceiver which receives the first power value from the first transceiver, and a first control circuit which calculates power transmission efficiency using the first power value and the second power value and adjusts at least one of inductance values of the inductors and/or at least one of capacitance values of the capacitors based on the power transmission efficiency.

9 Claims, 12 Drawing Sheets

(56) References Cited

FOREIGN PATENT DOCUMENTS

| | | |
|---|---|---|
| JP | 2009-268181 | 11/2009 |
| WO | 2004/073166 | 8/2004 |
| WO | 2008/118178 | 10/2008 |
| WO | 2009/037821 | 3/2009 |

OTHER PUBLICATIONS

Office Action dated Mar. 14, 2014 in counterpart Japanese Application No. 2011-541755 and English translation thereof.

Office Action issued Dec. 20, 2013 in Korean Patent Application No. 10-2012-7015225 and English-language translation thereof.

\* cited by examiner

WIRELESS POWER TRANSMISSION DEVICE

CROSS REFERENCE TO RELATED APPLICATIONS

This application is a continuation application of International Application No. PCT/JP2009/069550, filed on Nov. 18, 2009, the entire contents of which are incorporated herein by reference.

FIELD

Embodiments described herein relate generally to a wireless power transmission device.

BACKGROUND

Recently, wireless power transmission technology to perform non-contact transmission of power wirelessly using a power transmission coil and a power reception coil is adopted to a wide range of devices such as an IC card and a portable phone. A power transmission characteristic significantly varies depending on a positional relationship between the power transmission coil and the power reception coil. Therefore, actually, the positional relationship between the coils is fixed by means of a cradle and the like and a distance between the coils is limited to 0 cm to approximately few cm.

In order to realize a transmission distance not shorter than few tens of cm without limiting the positional relationship between the coils, it is required to detect the transmission characteristics different according to the position of the coils to adjust a circuit parameter. Therefore, a method of improving power transmission efficiency by adjusting a tuning capacitor by deriving an electromagnetic coupling coefficient by a circuit sensor and a table provided in a power transmission device is suggested.

The transmission characteristic is detected by detecting only a state of a resonance circuit in the power transmission device by a method of adjusting the power described above, so that an operational state of a power reception device is not understood. Therefore, there is a problem that correct transmission characteristic cannot be detected and sufficient power transmission efficiency cannot be obtained when the transmission distance is extended and the electromagnetic coupling coefficient becomes smaller.

DETAILED DESCRIPTION

According to one embodiment, a wireless power transmission device comprises a power transmission device, and a power reception device. The power reception device includes a first resonance circuit connected to a power reception coil, a load circuit, to which a first signal having a first power value is supplied from the first resonance circuit, and a first transceiver which transmits the first power value to the power transmission device. The power transmission device includes a second resonance circuit including a plurality of inductors and capacitors to which a second signal having a second power value is input, a power transmission coil connected to the second resonance circuit, which transmits the power, a second transceiver which receives the first power value from the first transceiver, and a first control circuit which calculates power transmission efficiency using the first power value and the second power value and adjusts at least one of inductance values of the inductors and/or at least one of capacitance values of the capacitors based on the power transmission efficiency.

Embodiments will now be explained with reference to the accompanying drawings.

First Embodiment

Figure 1:
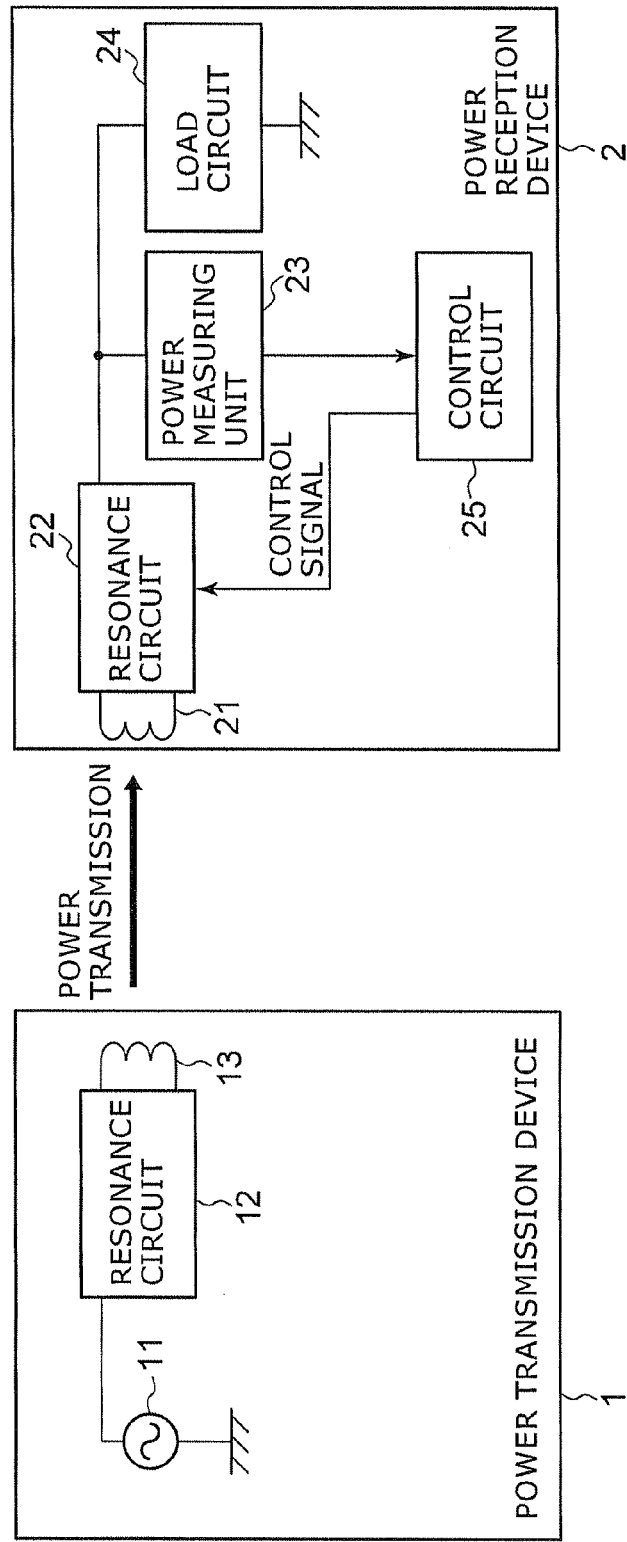
FIG. 1 is a schematic configuration diagram of a wireless power transmission device according to a first embodiment.

FIG. 1 illustrates a schematic configuration of a wireless power transmission device according to a first embodiment of the present invention. The wireless power transmission device is provided with a power transmission device 1 and a power reception device 2, to which power is transmitted (supplied) from the power transmission device 1.

The power transmission device 1 includes a high-frequency power source 11, a resonance circuit 12, and a power transmission coil 13. The resonance circuit 12 includes a plurality of inductors and capacitors not illustrated.

The power reception device 2 includes a power reception coil 21, a resonance circuit 22, a power measuring unit 23, a load circuit 24, and a control circuit 25. The resonance circuit includes a plurality of inductors and capacitors not illustrated.

The high-frequency power source 11 of the power transmission device 1 outputs a high-frequency signal having a frequency of a wireless frequency band. The resonance circuit 12 transmits the signal output from the high-frequency power source 11 from the power transmission coil 13 to the power reception device 2.

When the power reception coil 21 of the power reception device 2 is electromagnetically coupled to the power transmission coil 13, an inductive voltage is generated, and the generated inductive voltage is rectified and adjusted to be a predetermined voltage by the load circuit 24. The capacitors included in the resonance circuit 22 are connected to the power reception coil 21 in parallel or in series and resonate with a self-inductance of the power reception coil 21 to improve transmission efficiency. In such a configuration, it is possible to perform non-contact supply of the power consumed by the load circuit 24.

The power measuring unit 23 measures the power received in the power reception device 2 from an output of the resonance circuit 22. The power measuring unit 23 notifies the control circuit 25 of a measurement result. The control circuit 25 adjusts at least one of inductance values of the inductors and/or at least one of capacitance values of the capacitors included in the resonance circuit 22 based on the notified measurement result.

Figure 2:
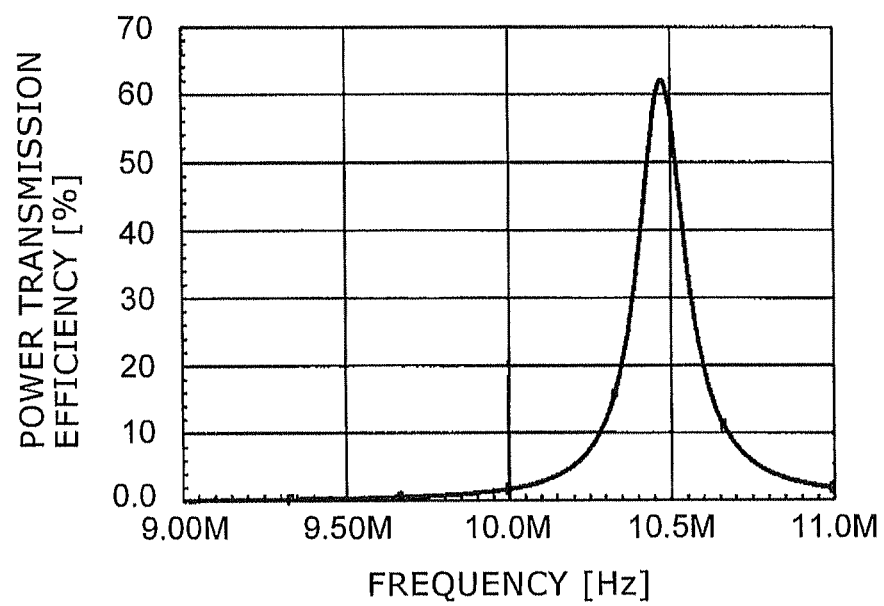
FIG. 2 is a graph illustrating an example of a relationship between a frequency and power transmission efficiency.

FIG. 2 illustrates an example of a simulation result of a relationship between the frequency used for wireless power transmission and power transmission efficiency. From this figure, it is understood that the power transmission efficiency is the highest in the vicinity of 10.4 MHz and the power transmission efficiency drastically drops when the frequency shifts by hundreds of kHz.

The frequency at which the power transmission efficiency is the highest significantly changes according to a coupling coefficient between the power transmission coil 13 and the power reception coil 21 and impedance of the load circuit 24. The coupling coefficient between the power transmission coil 13 and the power reception coil changes according to a relative positional relationship between the coils. Also, the impedance of the load circuit 24 changes according to an operational state of the load circuit 24.

Therefore, it is required to adjust a circuit parameter according to the relative positional relationship between the coils and the operational state of the load circuit 24 for obtaining high power transmission efficiency.

In this embodiment, the power measuring unit 23 measures the power received in the power reception device 2 and notifies the control circuit 25 of a measurement result. The control circuit 25 adjusts the circuit parameter of the resonance circuit 22 such that the power measured by the power measuring unit 23 is large. It becomes possible to adjust the circuit parameter such that the received power is large by directly measuring the power received in the power reception device 2.

In this manner, according to this embodiment, it is possible to obtain sufficient power transmission efficiency also in a state in which a transmission distance is extended.

Second Embodiment

Figure 3:
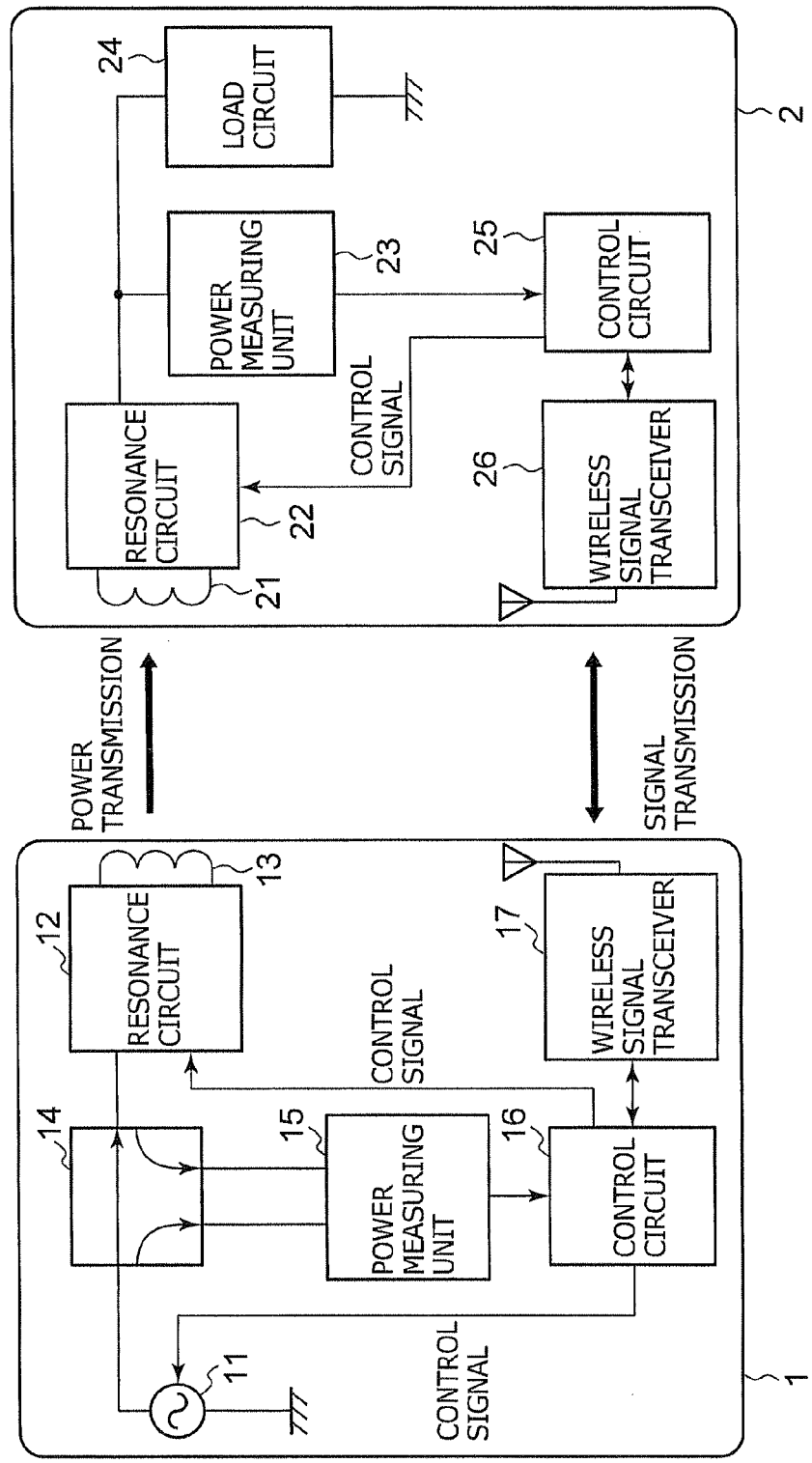
FIG. 3 is a schematic configuration diagram of a wireless power transmission device according to a second embodiment.

FIG. 3 illustrates a schematic configuration of a wireless power transmission device according to a second embodiment of the present invention. A power transmission device 1 according to this embodiment is obtained by further arranging a directional coupler 14, a power measuring unit 15, a control circuit 16, and a wireless signal transceiver 17 on the power transmission device 1 according to the above-described first embodiment illustrated in FIG. 1. Also, a power reception device 2 according to this embodiment is obtained by further arranging a wireless signal transceiver 26 on the power reception device 2 according to the above-described first embodiment illustrated in FIG. 1. In FIG. 3, a same reference sign is assigned to a same part as that of the first embodiment illustrated in FIG. 1 and description thereof is omitted.

The directional coupler 14 separates power supplied from a high-frequency power source 11 into the power incident on a resonance circuit 12 and the power reflected at an input terminal of the resonance circuit 12 to return to the high-frequency power source 11. Values of the separated two powers are measured by the power measuring unit 15. The power measuring unit 15 notifies the control circuit 16 of a measurement result.

In the power reception device 2, a received power value P2 measured by the power measuring unit 23 is transmitted to the power transmission device 1 by the wireless signal transceiver 26. The received power value P2 transmitted to the power transmission device 1 is received by the wireless signal transceiver 17. The wireless signal transceiver 17 notifies the control circuit 16 of the received power value P2.

According to this, the control circuit 16 may obtain both of a power value P1 incident on the resonance circuit 12 and the power value P2 received by the power reception device 2. The control circuit 16 calculates a ratio between P1 and P2, that is to say, power transmission efficiency $\eta = P2/P1$.

The control circuit 16 adjusts at least any one of an output frequency of the high-frequency power source 11, a circuit parameter of the resonance circuit 12, and the circuit parameter of a resonance circuit 22 for improving the power transmission efficiency $\eta$. The circuit parameter is an inductance value of an inductor and/or a capacitance value of a capacitor. Meanwhile, when the control circuit 16 adjusts the circuit parameter of the resonance circuit 22, this instructs the control circuit 25 to adjust the circuit parameter through the wireless signal transmitters/receivers 17 and 26.

In this manner, since the output frequency of the high-frequency power source 11 and the circuit parameters of the resonance circuits 12 and 22 may be adjusted based on the power transmission efficiency $\eta$ in this embodiment, it is possible to obtain sufficient power transmission efficiency also in a state in which a transmission distance is extended.

When a reflected power value (power value of the power reflected at the input terminal of the resonance circuit 12 to return to the high-frequency power source 11) Pr may be used in the power transmission device 1, it is also possible to adjust the circuit parameter of the resonance circuit 22 and/or the output frequency of the high-frequency power source 11 such that the power transmission efficiency $\eta$ is the highest as first adjustment and thereafter adjust the circuit parameter of the resonance circuit 12 such that the reflected power value Pr is the smallest as second adjustment.

In such a two-step adjustment, the first adjustment allows the power incident on the resonance circuit 12 to be efficiently received by the power reception device 2. Also, the second adjustment allows the power output from the high-frequency power source 11 to be efficiently incident on the resonance circuit 12. Therefore, it becomes possible to efficiently receive the power output from the high-frequency power source 11 by the power reception device 2.

Meanwhile, although the power transmission efficiency $\eta$ is calculated on a side of the power transmission device 1 in the above description, this may be calculated on a side of the power reception device 2. In this case, the power values P1 and Pr are transmitted from the power transmission device 1 to the power reception device 2 by means of the wireless signal transmitters/receivers 17 and 26. Also, a frequency control signal of the high-frequency power source 11 and/or a circuit parameter control signal of the resonance circuit 12 are transmitted from the side of the power reception device 2 to the side of the power transmission device 1 by means of the wireless signal transmitters/receivers 17 and 26.

In the above-described second embodiment, as illustrated in FIG. 3, a control signal is output from the control circuit 16 to the high-frequency power source 11 and the resonance circuit 12 and the control signal is output from the control circuit 25 to the resonance circuit 22. However, it is only necessary to adjust at least any one of the output frequency of the high-frequency power source 11, the circuit parameter of the resonance circuit 12, and the circuit parameter of the resonance circuit 22 for improving the power transmission efficiency η. Therefore, the control signal corresponding to that other than an object of the adjustment may be omitted.

Third Embodiment

Figure 4:
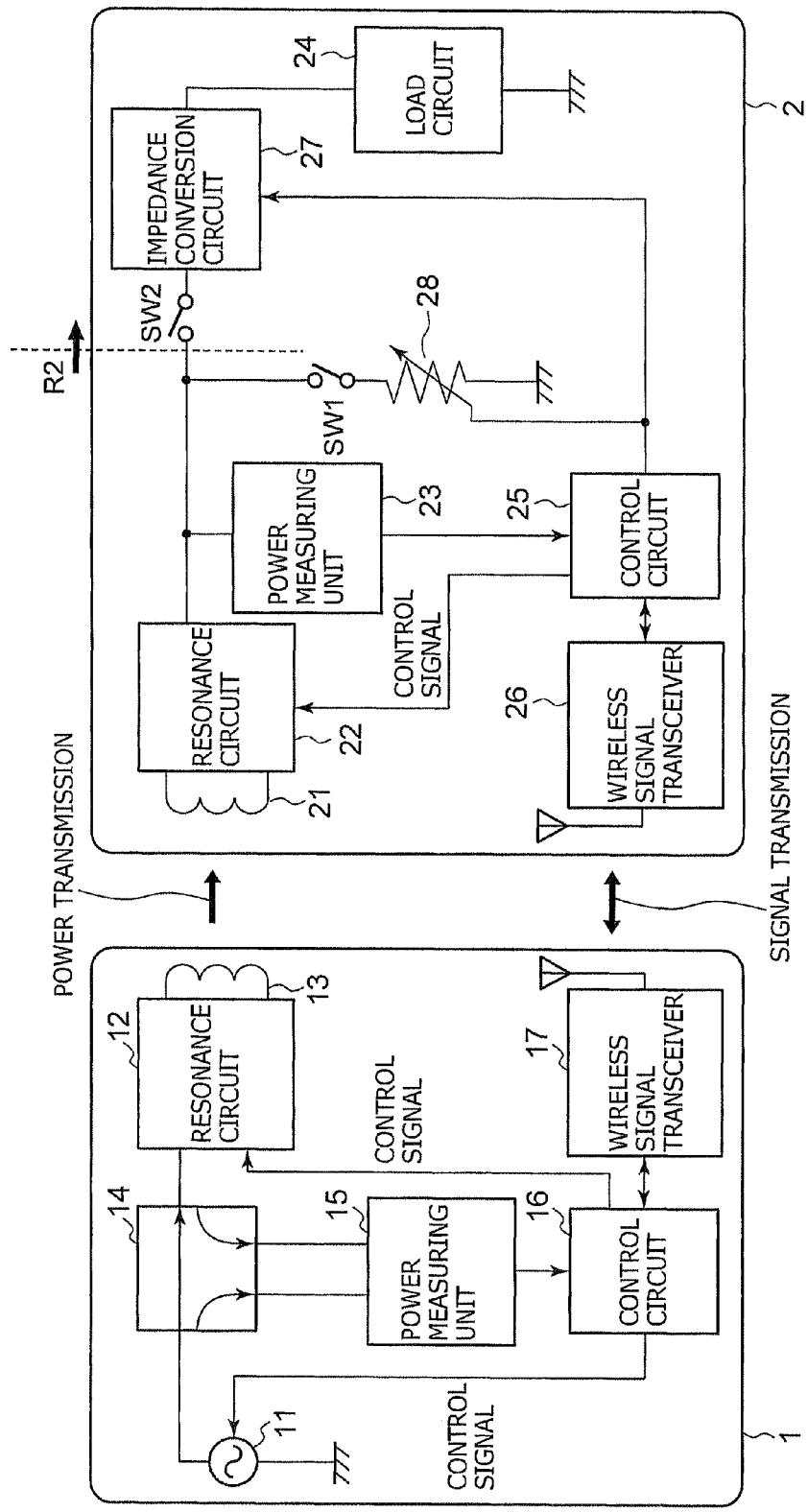
FIG. 4 is a schematic configuration diagram of a wireless power transmission device according to a third embodiment.

FIG. 4 illustrates a schematic configuration of a wireless power transmission device according to a third embodiment of the present invention. A power reception device 2 according to this embodiment is obtained by further arranging an impedance conversion circuit 27, a variable resistor 28, and switches SW1 and SW2 on the power reception device 2 according to the above-described second embodiment illustrated in FIG. 3. In FIG. 4, a same reference sign is assigned to a same part as that of the second embodiment illustrated in FIG. 3 and description thereof is omitted.

The switch SW1 is arranged between a resonance circuit 22 and the variable resistor 28. One end of the switch SW2 is connected to an output terminal of the resonance circuit 22 and the other end thereof is connected to an input terminal of the impedance conversion circuit 27. An output terminal of the impedance conversion circuit 27 is connected to a load circuit 24. The adjustment of the impedance conversion circuit 27 and the variable resistor 28 and on/off control of the switches SW1 and SW2 are performed by a control circuit 25.

The operation of the wireless power transmission device is described. First, the switch SW1 is turned on and the switch SW2 is turned off in the power reception device 2. At that time, a load connected to the resonance circuit 22 is the variable resistor 28. In this embodiment, as in the above-described second embodiment, at least any one of a frequency of a high-frequency power source 11, a circuit parameter of a resonance circuit 12, and the circuit parameter of the resonance circuit 22 is adjusted and a resistance value R2' of the variable resistor 28 is also adjusted for improving power transmission efficiency η. According to this, an optimal resistance value R2' is obtained. That is to say, the variable resistor 28 is a dummy load for obtaining the optimal resistance value R2' with which the power transmission efficiency η is not lower than a predetermined value (the highest).

Next, when the load circuit 24 is actually operated, the switch SW1 is turned off and the switch SW2 is turned on. The impedance conversion circuit 27 is connected between the resonance circuit 22 and the load circuit 24. The control circuit 25 controls the impedance conversion circuit 27 such that impedance R2 looking from the resonance circuit 22 into the side of the load circuit 24 is equivalent to the above-described resistance value R2'.

In this manner, it is possible to further improve the power transmission efficiency by performing impedance control of the load circuit 24 in addition to the adjustments of the frequency of the high-frequency power source 11 and the circuit parameters of the resonance circuits 12 and 22.

Fourth Embodiment

Figure 5:
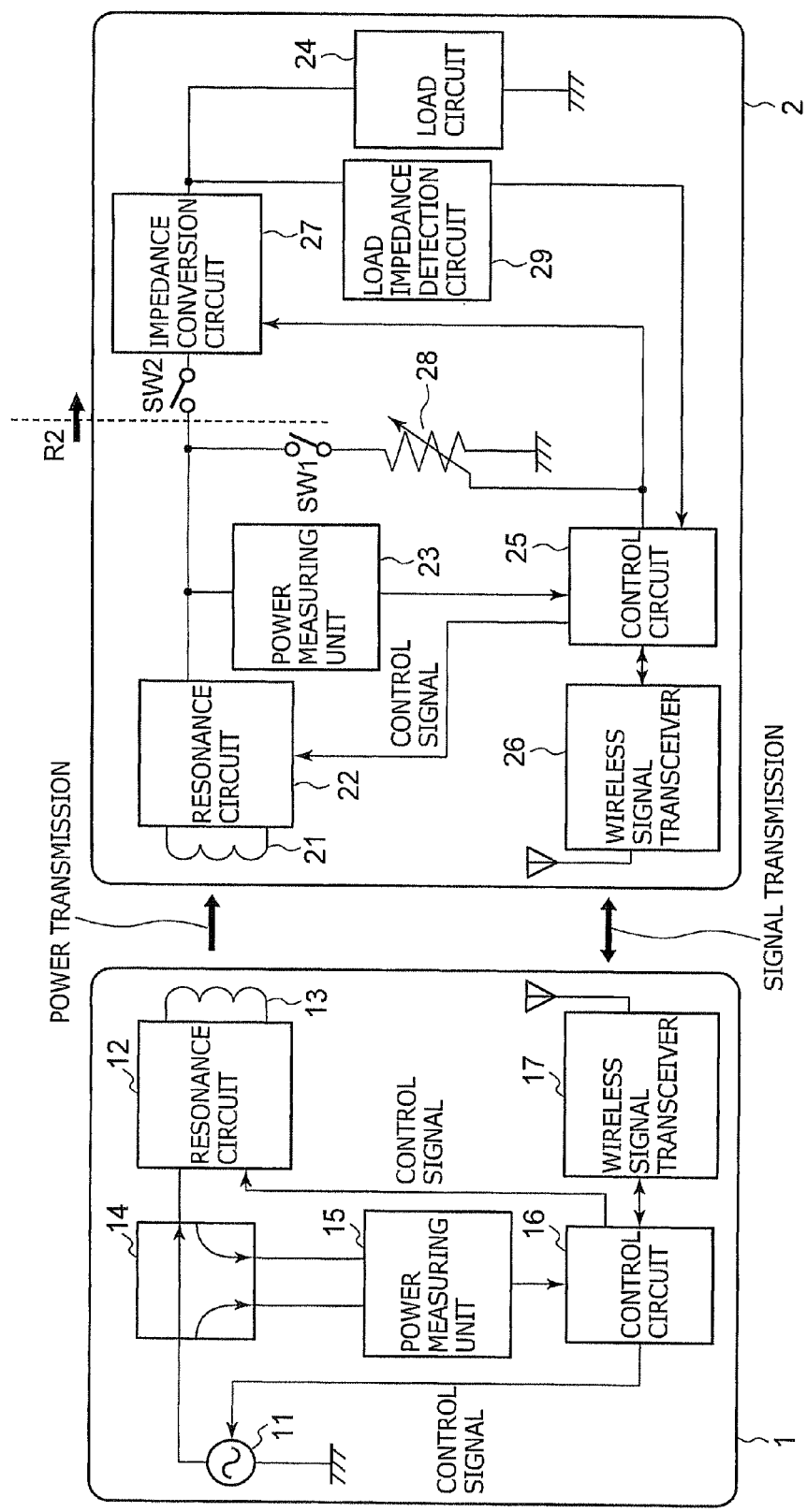
FIG. 5 is a schematic configuration diagram of a wireless power transmission device according to a fourth embodiment.

FIG. 5 illustrates a schematic configuration of a wireless power transmission device according to a fourth embodiment of the present invention. A power reception device 2 according to this embodiment is obtained by further arranging a load impedance detection circuit 29 on the power reception device 2 according to the above-described third embodiment illustrated in FIG. 4. In FIG. 5, a same reference sign is assigned to a same part as that of the third embodiment illustrated in FIG. 4 and description thereof is omitted.

When adjustments of circuit parameters of resonance circuits 12 and 22 and an output frequency of a high-frequency power source 11 and impedance control are performed by a method as described in the above-described third embodiment, it is not required to perform the similar parameter adjustment and impedance control again unless a positional relationship between a power transmission coil 13 and a power reception coil changes. However, when the positional relationship between the power transmission coil 13 and the power reception coil 21 changes, it is required to perform the similar parameter adjustment and impedance control again.

Power measured by a power measuring unit 23 in the power reception device 2 is affected by both of the power consumed by a load circuit 24 and the positional relationship between the power transmission coil 13 and the power reception coil 21. That is to say, when a measurement result by the power measuring unit 23 changes, it is not possible to distinguish whether the change is caused by change in the load circuit 24 or the change in the positional relationship between the power transmission coil 13 and the power reception coil 21 only from the measurement result. In this embodiment, it is possible to distinguish them and to judge whether to perform the adjustment of the circuit parameter and the like again.

The load impedance detection circuit 29 in the power reception device 2 may detect change in load impedance. Therefore, in a case in which received power detected by the power measuring unit 23 changes, if the change in the load impedance is further detected by the load impedance detection circuit 29, it is considered that the change in the received power is caused by the change in a load and it is judged to be unnecessary to perform the adjustment of the circuit parameter and the like again.

On the other hand, in a case in which the received power detected by the power measuring unit 23 changes, if the change in the load impedance is not detected by the load impedance detection circuit 29 (when the change with time in the load impedance is not larger than a threshold), it is considered that the change in the received power is caused by the change in the positional relationship between the power transmission coil 13 and the power reception coil 21, and it is judged to be necessary to perform the adjustment of the circuit parameter and the like again. In this case, the adjustment of the circuit parameter and the like is performed again by a method similar to the method described in the above-described third embodiment.

In this manner, according to this embodiment, it is possible to distinguish the change in the positional relationship between the power transmission coil 13 and the power reception coil 21 and the change in the load by detecting the change in the load impedance and to perform the adjustment of the circuit parameter and the like required for improving the power transmission efficiency again.

Figure 6:
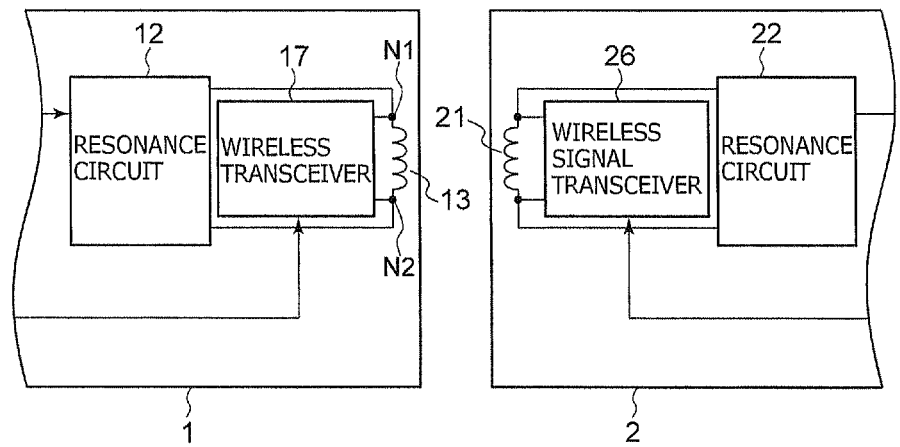
FIG. 6 is a schematic configuration diagram of a wireless power transmission device according to a modified example.

Although each of wireless signal transmitters/receivers 17 and 26 includes a dedicated antenna as illustrated in FIGS. 3 to 5 in the above-described second to fourth embodiments, it is also possible to use the power transmission coil 13 and the power reception coil 21 as the antennas of wireless communication as illustrated in FIG. 6. The wireless signal transceiver 17 and the power transmission coil 13 are connected to each other at connecting points (nodes) N1 and N2. The node N1 may be located on an intermediate point of the power transmission coil 13. It is also possible to connect the wireless signal transceiver 17 and the power transmission coil 13 to each other via a single line to omit the node N2.

Figure 7:
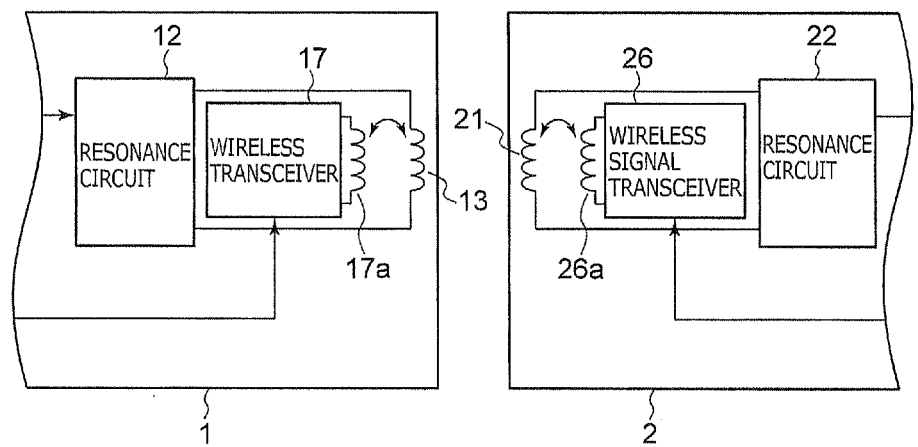
FIG. 7 is a schematic configuration diagram of the wireless power transmission device according to the modified example.

It is also possible that the wireless signal transmitters/receivers 17 and 26 are provided with coils 17a and 26a to be electromagnetically coupled to the power transmission coil 13 and the power reception coil 21, respectively, as illustrated in FIG. 7.

Fifth Embodiment

Figure 8:
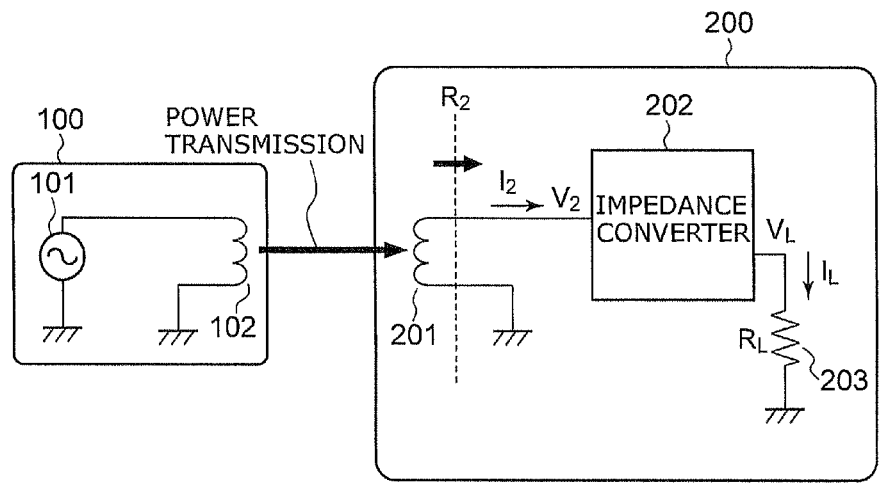
FIG. 8 is a schematic configuration diagram of a wireless power transmission device according to a fifth embodiment.

FIG. 8 illustrates a schematic configuration of a wireless power transmission device according to a fifth embodiment of the present invention. The wireless power transmission device is provided with a power transmission device 100 and a power reception device 200, to which power is transmitted (supplied) from the power transmission device 100.

The power transmission device 100 includes a high-frequency power source 101 and a power transmission coil 102. The power reception device 200 includes a power reception coil 201, an impedance converter 202, and a load circuit 203. High-frequency power generated by the high-frequency power source 101 to be transmitted by the power transmission coil 102 is received by the power reception coil 201 in the power reception device 200 by electromagnetic coupling.

Figure 9:
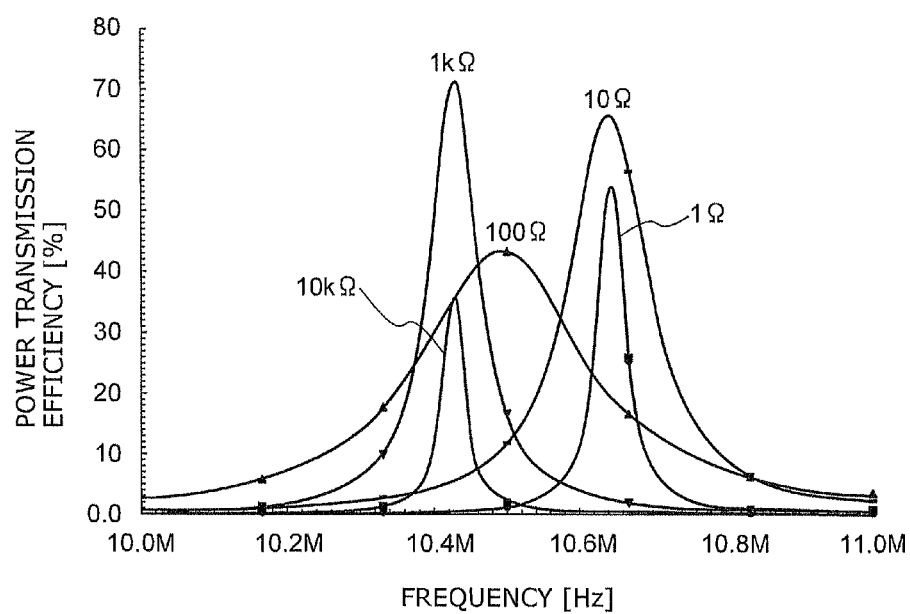
FIG. 9 is a graph illustrating an example of a relationship between a frequency and power transmission efficiency.

In such a wireless power transmission using resonance, power transmission efficiency is significantly influenced by change in a load impedance value R2 looking from the power reception coil 201 into the side of the load circuit 203. FIG. 9 illustrates a frequency characteristic of the power transmission efficiency when a load resistance value looking from the power reception coil 201 is changed within a range from 1Ω to 10 kΩ. From FIG. 9, it is understood that the power transmission efficiency significantly changes by change in the load resistance when a power transmission frequency is constant.

This embodiment is configured to set the load impedance value $R_2$ looking from the power reception coil 201 to a desired value regardless of impedance $R_L$ of the load circuit 203. Therefore, the load impedance value $R_2$ is set to the desired value by arranging the impedance converter 202 between the power reception coil 201 and the load circuit 203 of the power reception device 200. A transformer is used, for example, as the impedance converter 202 in the case of an alternating-current output.

When a voltage value supplied to the load circuit 203 is set to $V_L$, power $P_L$ consumed by the load circuit 203 is represented by an equation 1.

$$P_L = \frac{V_L^2}{R_L} \qquad \text{[Equation 1]}$$

On the other hand, when an input voltage of the impedance converter 202 is set to $V_2$ and it is supposed that there is no loss in the impedance converter 202, a following equation 2 is established.

$$P_L = \frac{V_2^2}{R_2} \qquad \text{[Equation 2]}$$

From the equations 1 and 2, the input voltage $V_2$ of the impedance converter 202 may be represented by a following equation 3.

$$V_2 = V_L \sqrt{\frac{R_2}{L_L}} \qquad \text{[Equation 3]}$$

Therefore, it becomes possible to set the load impedance value $R_2$ looking from the power reception coil 201 to the desired value by adjusting an output voltage $V_1$ of the high-frequency power source 101 so as to satisfy the equation 3, so that highly-efficient power transmission may be realized.

Sixth Embodiment

Figure 10:
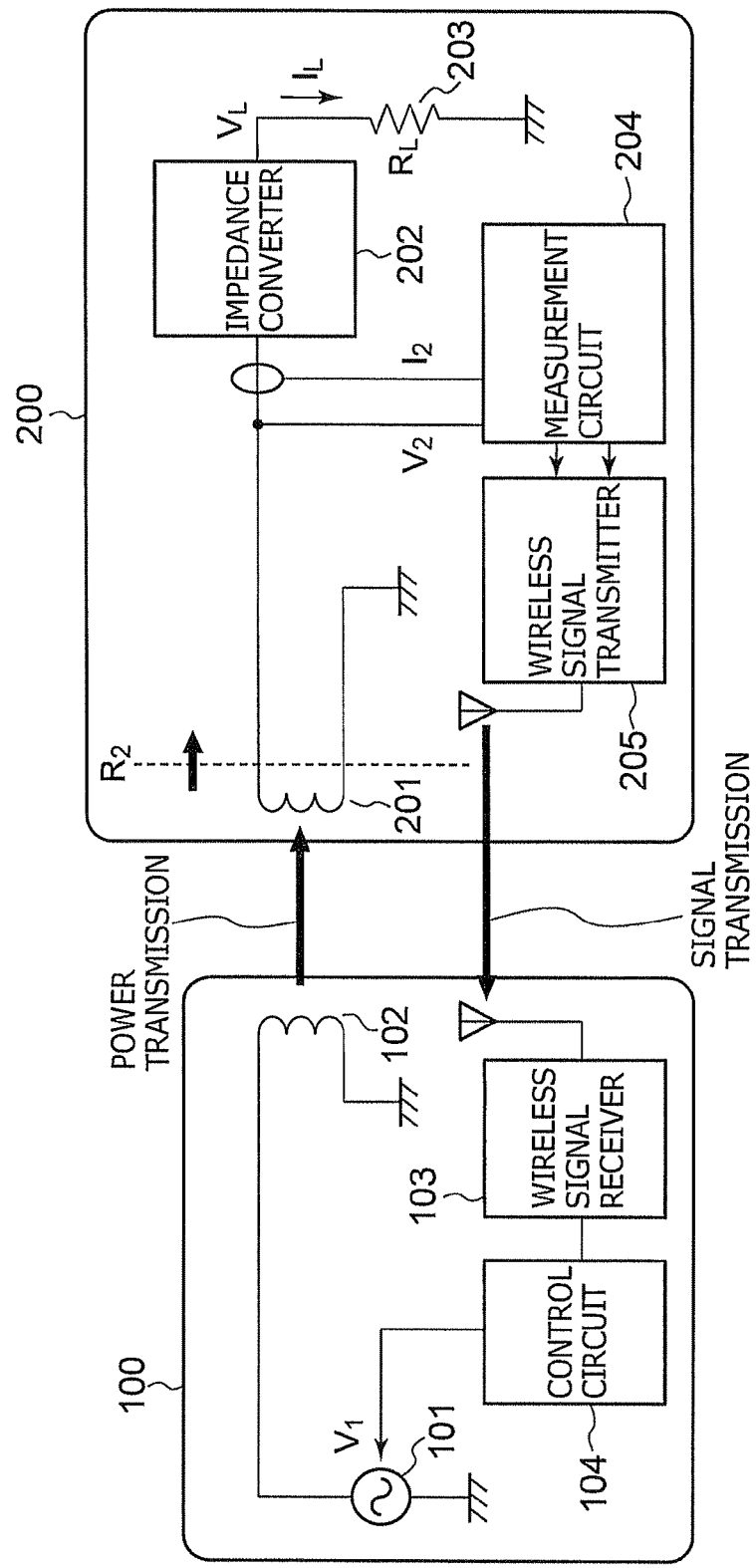
FIG. 10 is a schematic configuration diagram of a wireless power transmission device according to a sixth embodiment.

FIG. 10 illustrates a schematic configuration of a wireless power transmission device according to a sixth embodiment of the present invention. A power transmission device 100 according to this embodiment is obtained by further arranging a wireless signal receiver 103 and a control circuit 104 on the power transmission device 100 according to the above-described fifth embodiment illustrated in FIG. 8. Also, a power reception device 200 according to this embodiment is obtained by further arranging a measurement circuit 204 and a wireless signal transmitter 205 on the power reception device 200 according to the above-described fifth embodiment illustrated in FIG. 8. In FIG. 10, a same reference sign is assigned to a same part as that of the fifth embodiment illustrated in FIG. 8 and description thereof is omitted.

The measurement circuit 204 measures an input voltage $V_2$ and a current $I_2$ of an impedance converter 202. Power $P_2$ observed at an input terminal of the impedance converter 202 is represented by a following equation 4.

$$P_2 = \frac{V_2^2}{R_2} \qquad \text{[Equation 4]}$$

Therefore, the voltage $V_2$ is represented by a following equation 5.

$$V_2 = \sqrt{R_2 P_2} \qquad \text{[Equation 5]}$$

From the above-described equation 5, the voltage $V_2$ required for maintaining a load impedance value $R_2$ constant is obtained by measuring the power $P_2$ at the input terminal of the impedance converter 202. Therefore, an output voltage $V_1$ of a high-frequency power source 101 may be adjusted so as to realize $V_2$ in the equation 5. This embodiment is configured to adjust such output voltage $V_1$.

The wireless signal transmitter 205 transmits the voltage $V_2$ and the current $I_2$ measured by the measurement circuit 204 to the wireless signal receiver 103 of the power transmission device 100. The wireless signal receiver 103 notifies the control circuit 104 of the received voltage $V_2$ and current $I_2$. The control circuit 104 obtains the load impedance value $R_2$ from the notified voltage $V_2$ and current $I_2$. The control circuit 104 controls the output voltage $V_1$ of the high-frequency power source 101 such that a value of the voltage $V_2$ satisfies the above-described equation 5.

According to this, it becomes possible to maintain the load impedance $R_2$ looking from the power reception coil 201 constant and highly-efficient power transmission may be always realized even in the case in which the power in the load circuit 203 changes.

Meanwhile, the power $P_2$ may be obtained by measuring a voltage $V_L$ and a current $I_L$ not at the input terminal of the impedance converter 202 but at an input terminal of the load circuit 203.

Although the load impedance value $R_2$ is calculated on the side of the power transmission device 100 in this embodiment, this may be calculated on the side of the power reception device 200. In this case, the load impedance value $R_2$ calculated on the side of the power reception device 200 is transmitted from the wireless signal transmitter 205 to the wireless signal receiver 103.

Seventh Embodiment

Figure 11:
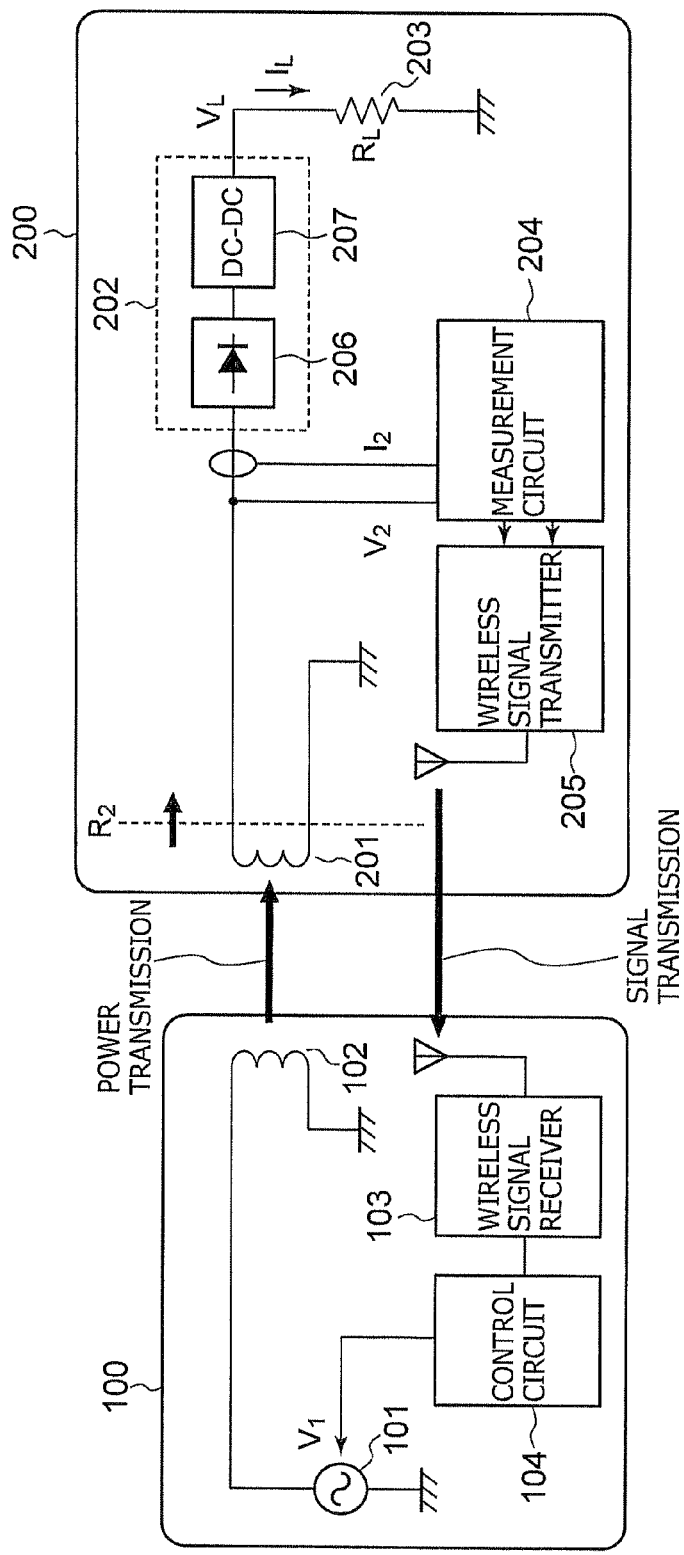
FIG. 11 is a schematic configuration diagram of a wireless power transmission device according to a seventh embodiment.

FIG. 11 illustrates a schematic configuration of a wireless power transmission device according to a seventh embodiment of the present invention. In this embodiment, an impedance converter 202 of a power reception device 200 is composed of a rectifier 206 and a DC-DC converter 207 to supply direct-current power to a load circuit 203.

Alternating-current power received by a power reception coil 201 is converted to direct-current by the rectifier 206 and desired output voltage $V_L$ or output current $I_L$ is supplied to the load circuit 203 by the DC-DC converter 207.

In this embodiment also, as described in the above-described sixth embodiment, the power at an input terminal of the rectifier 206 is measured and an output voltage $V_1$ of a high-frequency power source 101 is adjusted such that an input voltage $V_2$ of the rectifier 206 satisfies the above-described equation 5.

In this manner, it is possible to maintain impedance $R_2$ looking from the power reception coil 201 at a desired value even in the case of a direct-current drive load by using the rectifier 206 and the DC-DC converter 207, so that highly-efficient wireless power transmission may be performed.

Eighth Embodiment

Figure 12:
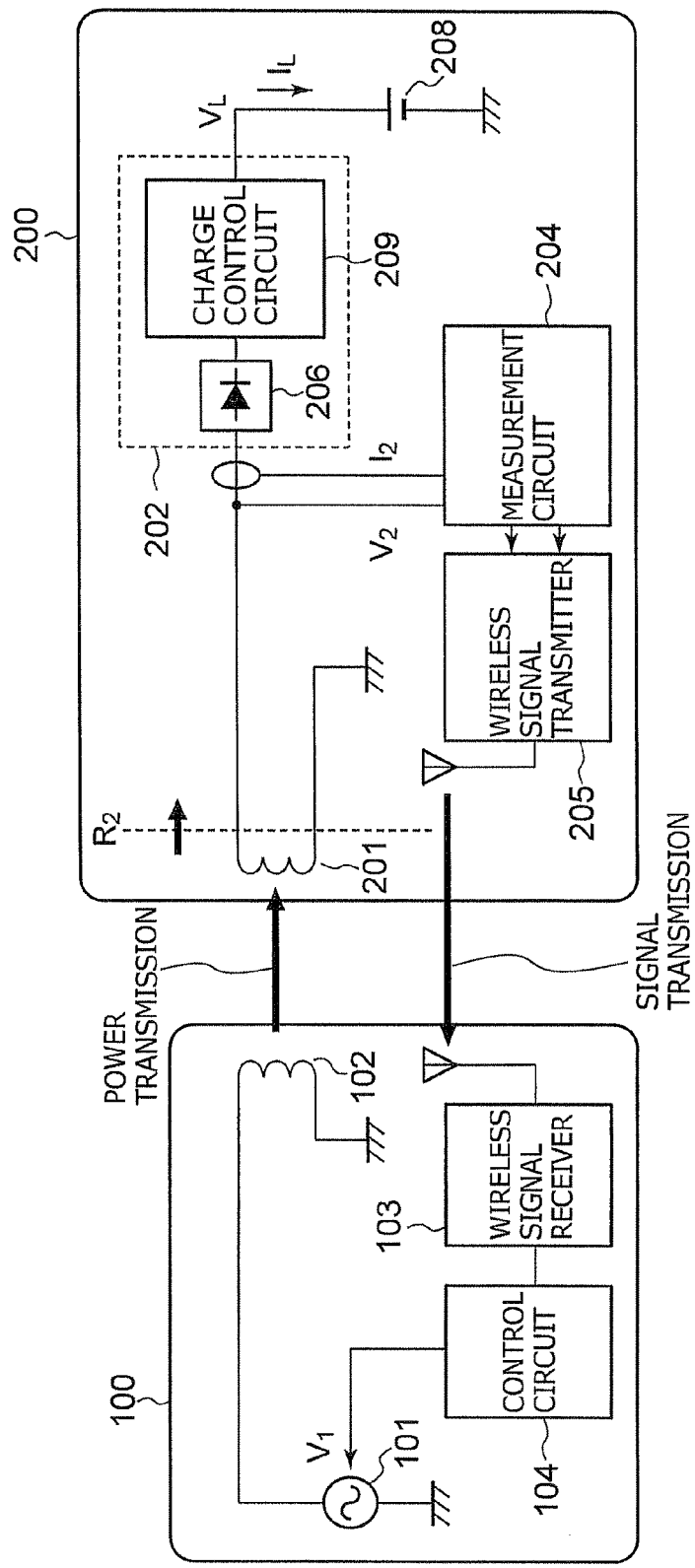
FIG. 12 is a schematic configuration diagram of a wireless power transmission device according to an eighth embodiment.

FIG. 12 illustrates a schematic configuration of a wireless power transmission device according to an eighth embodiment of the present invention. This embodiment in which a rechargeable battery 208 is connected as a load of a power reception device 200 is configured to charge the rechargeable battery 208 by wireless power transmission. The power reception device 200 according to this embodiment is provided with a charge control circuit 209 in place of a DC-DC converter 207 in FIG. 11.

The charge control circuit 209 is a circuit which supplies direct-current power rectified by a rectifier 206 to the load (rechargeable battery 208) under a condition that an output voltage $V_L$ is constant or a condition that an output current $I_L$ is constant, and may be considered as a DC-DC converter in a broad sense. The charge control circuit 209 switches the condition that the output voltage $V_L$ is constant or the condition that the output current $I_L$ is constant according to a charge status of the rechargeable battery 208.

In this embodiment also, as described in the above-described sixth and seventh embodiments, the power at an input terminal of the rectifier 206 is measured and an output voltage $V_1$ of a high-frequency power source 101 is adjusted such that an input voltage $V_2$ of an impedance converter 202 satisfies the above-described equation 5.

In this manner, even in the case in which the rechargeable battery 208 is charged under the two conditions that the voltage is constant or the current is constant using the charge control circuit 209, it is possible to maintain impedance $R_2$ looking from a power reception coil 201 at a desired value, so that highly-efficient wireless power transmission may be performed.

Ninth Embodiment

Figure 13:
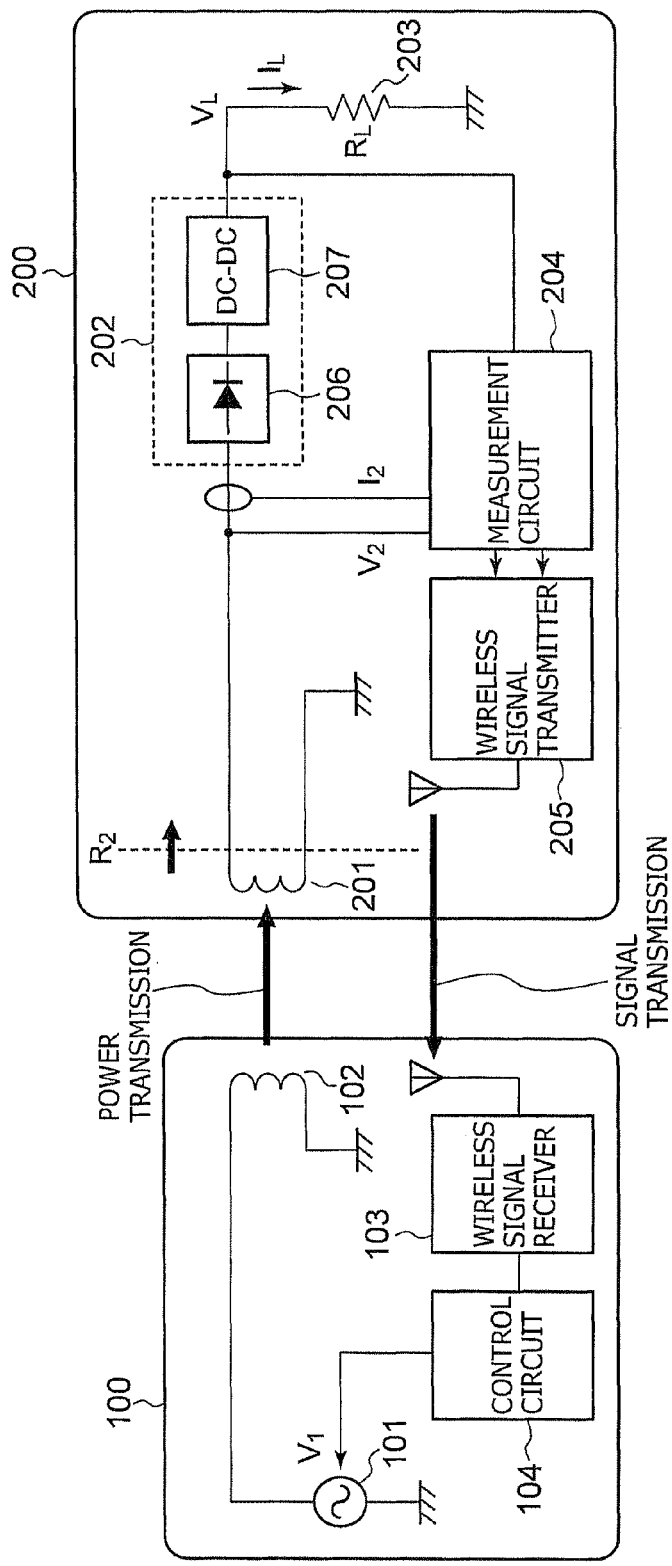
FIG. 13 is a schematic configuration diagram of a wireless power transmission device according to a ninth embodiment.

FIG. 13 illustrates a schematic configuration of a wireless power transmission device according to a ninth embodiment of the present invention. The wireless power transmission device according to this embodiment is configured so as to be similar to that of the above-described seventh embodiment illustrated in FIG. 11 except that a measurement circuit 204 measures an output voltage $V_L$ of a DC-DC converter 207.

A case in which the DC-DC converter 207 operates such that the output voltage $V_L$ is constant in the above-described seventh embodiment is considered. In general, the DC-DC converter 207 may maintain the output voltage $V_L$ at a desired value when an input voltage is sufficiently high. However, it becomes difficult to maintain the output voltage $V_L$ at the desired value when the input voltage of the DC-DC converter 207 decreases. In this case, the DC-DC converter 207 cannot supply sufficient power to a load circuit 203. This embodiment solves such a problem.

A configuration to measure a voltage $V_2$ and a current $I_2$ at an input terminal of a rectifier 206 to obtain power $P_2$ is similar to that of the above-described seventh embodiment. In addition to this, the measurement circuit 204 also measures the output voltage $V_L$ of the DC-DC converter 207 in this embodiment.

When the voltage $V_L$ is not lower than the desired value, it is considered that the sufficient voltage is applied to an input of the DC-DC converter 207. Therefore, as in the above-described seventh embodiment, the input voltage $V_2$ of the rectifier 206, which satisfies an equation 5, is obtained from the power P2 and an output voltage V1 of a high-frequency power source 101 is adjusted for realizing the same.

On the other hand, when the output voltage $V_L$ of the DC-DC converter 207 is lower than the desired value, it is considered that the DC-DC converter 207 is not operating normally. Therefore, the output voltage $V_1$ of the high-frequency power source 101 is increased for increasing the input voltage of the DC-DC converter 207. When the output voltage $V_L$ of the DC-DC converter 207 increases up to the desired value consequently, it is possible to maintain impedance $R_2$ looking from a power reception coil 201 at a desired value by obtaining the input voltage $V_2$ of the rectifier 206, which satisfies the equation 5, from the power $P_2$ and adjusting the output voltage $V_1$ of the high-frequency power source 101 as described above.

Figure 14:
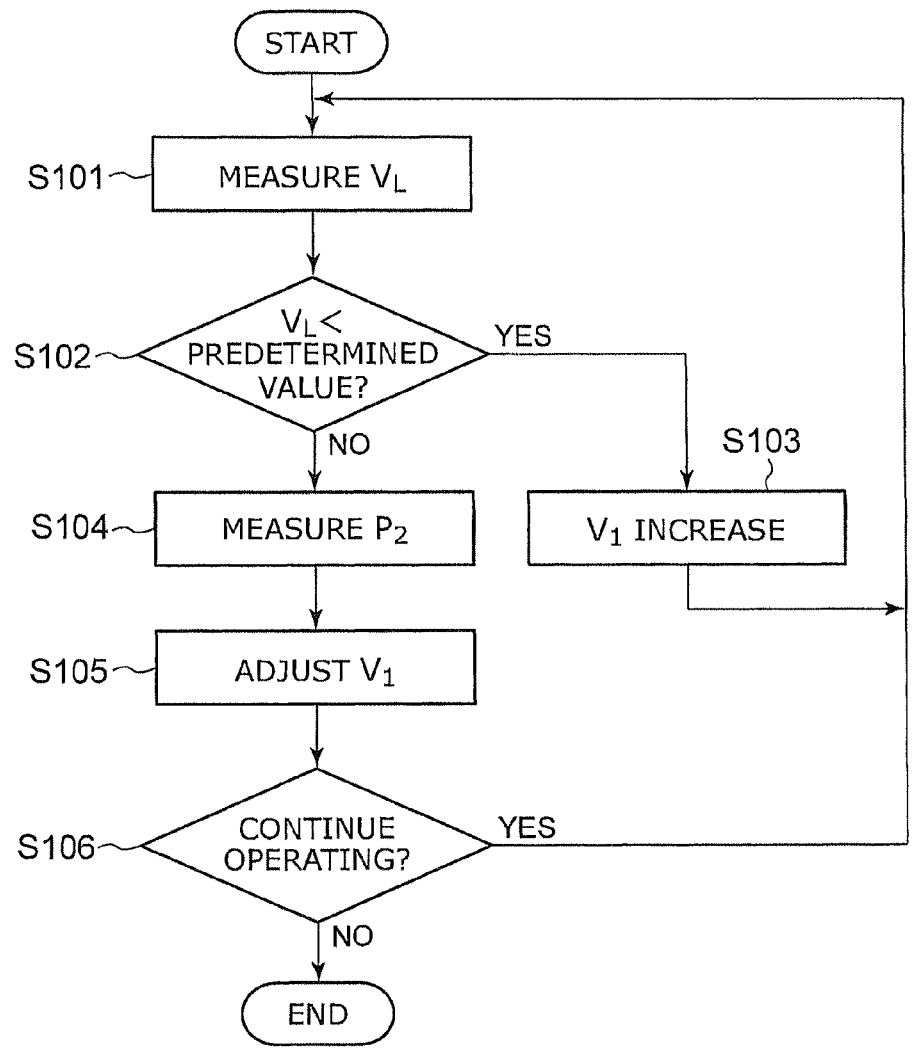
FIG. 14 is a flowchart illustrating operation of the wireless power transmission device according to the ninth embodiment.

FIG. 14 illustrates a flowchart of such operation.

(Step S101) The output voltage $V_L$ of the DC-DC converter 207 is measured.

(Step S102) It is judged whether the output voltage $V_L$ is lower than a predetermined value. When the voltage is lower than the predetermined value, the procedure proceeds to a step S103 and when it is not lower than the predetermined value, the procedure proceeds to a step S104.

(Step S103) The output voltage $V_1$ of the high-frequency power source 101 is increased.

(Step S104) The power $P_2$ at the input terminal of the rectifier 206 is measured.

(Step S105) The output voltage $V_1$ of the high-frequency power source 101 is adjusted such that the input voltage $V_2$ of the rectifier 206 satisfies the equation 5.

(Step S106) When the wireless power transmission device continues operating, the procedure returns to the step S101.

In this manner, it is possible to judge whether the DC-DC converter 207 is operating normally by observing the output voltage $V_L$ of the DC-DC converter 207, so that, even when the DC-DC converter 207 is not operating normally, it becomes possible to allow the DC-DC converter 207 to return to its normal operation by increasing the input voltage thereof.

Meanwhile, although a case in which the DC-DC converter 207 is operating at the constant output voltage is described in this embodiment, similar control is also possible when an output current $I_L$ is constant. That it so say, it is possible to increase the output voltage $V_1$ of the high-frequency power source 101 when the output current $I_L$ of the DC-DC converter 207 is lower than a desired value, and to adjust the output voltage $V_1$ of the high-frequency power source 101 such that the impedance $R_2$ becomes the desired value after the current $I_L$ increases up to the desired value.

Although each of wireless signal receiver 103 and wireless signal transmitter 205 includes a dedicated antenna as illustrated in FIGS. 10 to 13 in the above-described sixth to ninth embodiments, it is also possible to use the power transmission coil 102 and a power reception coil 201 as the antennas of wireless communication. The configuration in this case is similar to that illustrated in FIGS. 6 and 7.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless power transmission device, comprising:
a power transmission device; and
a power reception device, to which power is transmitted from the power transmission device, wherein
the power reception device includes
a power reception coil which receives the power,
a first resonance circuit connected to the power reception coil,
a load circuit to which a first signal having a first power value is supplied from the first resonance circuit,
a first power measuring unit, which measures the first power value, and
a first transceiver which transmits the first power value to the power transmission device, and
the power transmission device includes
a power source, which generates a second signal having a second power value,
a second resonance circuit including a plurality of inductors and capacitors to which the second signal is input,
a power transmission coil connected to the second resonance circuit, which transmits the power,
a second power measuring unit which measures the second power value,
a second transceiver which receives the first power value from the first transceiver, and
a first control circuit which calculates power transmission efficiency using the first power value and the second power value and adjusts at least one of inductance values of the inductors and/or at least one of capacitance values of the capacitors based on the power transmission efficiency.

2. The device according to claim 1, wherein
the first resonance circuit includes a plurality of inductors and capacitors,
the second transceiver transmits the power transmission efficiency to the first transceiver, and
the power reception device further includes a second control circuit which adjusts at least one of inductance values of the inductors and/or at least one of capacitance values of the capacitors included in the first resonance circuit based on the first power value or the power transmission efficiency.

3. The device according to claim 1, wherein the first transceiver and the second transceiver transmit or receive the signal through the power reception coil and the power transmission coil.

4. A wireless power transmission device, comprising:
a power transmission device; and
a power reception device, to which power is transmitted from the power transmission device, wherein
the power reception device includes
a power reception coil which receives the power,
a first resonance circuit connected to the power reception coil,
a load circuit to which a first signal having a first power value is supplied from the first resonance circuit,
a first power measuring unit which measures the first power value, and
a transmitter which transmits the first power value to the power transmission device, and
the power transmission device includes
a power source which generates a second signal having a second power value,
a second resonance circuit including a plurality of inductors and capacitors to which the second signal is input,
a power transmission coil connected to the second resonance circuit, which transmits the power,
a second power measuring unit which measures the second power value,
a receiver which receives the first power value from the first transceiver, and
a first control circuit which calculates power transmission efficiency using the first power value and the second power value and adjusts a frequency of the second signal output from the power source based on the power transmission efficiency.

5. The device according to claim 4, wherein
the receiver transmits the power transmission efficiency to the transmitter, and
the power reception device further includes
a first switch and a second switch, one end of each of which is connected to an output terminal of the first resonance circuit,
a variable resistor connected to the other end of the first switch,
an impedance conversion circuit arranged between the other end of the second switch and the load circuit, and
a second control circuit which obtains a resistance value of the variable resistor with which the power transmission efficiency is not lower than a predetermined value when the first switch is turned on and the second switch is turned off and controls the impedance conversion circuit such that impedance looking from the first resonance circuit into the side of the load circuit is equivalent to the resistance value when the first switch is turned off and the second switch is turned on.

6. The device according to claim 5, wherein
the power reception device further includes a detection circuit which detects change in load impedance from an output signal of the impedance conversion circuit, and
at least any one of adjustment of the frequency by the first control circuit and control of the impedance conversion circuit by the second control circuit is performed when the first power value changes and change with time in the load impedance is not larger than a predetermined threshold.

7. The device according to claim 6, wherein the receiver and the transmitter receive and transmit the signal through the power reception coil and the power transmission coil.

8. A power transmission device, which transmits power to a power reception device, comprising:
   a power source which generates a first signal having a first power value;
   a first resonance circuit including a plurality of inductors and capacitors to which the first signal is input;
   a power transmission coil connected to the first resonance circuit which transmits the power;
   a power measuring unit which measures the first power value;
   a receiver which receives a second power value of a second signal supplied from a second resonance circuit connected to a power reception coil to a load circuit in the power reception device transmitted from the power reception device; and
   a control circuit which calculates power transmission efficiency using the first power value and the second power value and adjusts at least one of inductance values of the inductors and/or at least one of capacitance values of the capacitors based on the power transmission efficiency.

9. A power reception device, to which power is transmitted from a power transmission device, comprising:
   a power reception coil which receives the power;
   a resonance circuit including a plurality of inductors and capacitors and connected to the power reception coil;
   a load circuit to which a first signal having a first power value is supplied from the resonance circuit;
   a power measuring unit which measures the first power value;
   a transceiver which transmits the first power value to the power transmission device and receives power transmission efficiency calculated based on a second power value of a second signal generated by a power source for transmitting the power in the power transmission device and the first power value from the power transmission device; and
   a control circuit which adjusts at least one of inductance values of the inductors and/or at least one of capacitance values of the capacitors included in the resonance circuit based on the power transmission efficiency.

* * * * *